(12) United States Patent
Kreische (10) Patent No.: US 9,725,855 B2
(45) Date of Patent: Aug. 8, 2017

(54) ASSEMBLY FOR VIBRATING A COMPACTING DRUM OF A COMPACTING MACHINE

(71) Applicant: VOLVO CONSTRUCTION EQUIPMENT AB, Eskilstuna (SE)

(72) Inventor: Michael Kreische, Hannover (DE)

(73) Assignee: Volvo Construction Equipment AB, Eskilstuna (SE)

( * ) Notice: Subject to any disclaimer, the term of this patent is extended or adjusted under 35 U.S.C. 154(b) by 4 days.

(21) Appl. No.: 14/785,342

(22) PCT Filed: Apr. 25, 2013

(86) PCT No.: PCT/SE2013/000056
§ 371 (c)(1),
(2) Date: Oct. 18, 2015

(87) PCT Pub. No.: WO2014/175787
PCT Pub. Date: Oct. 30, 2014

(65) Prior Publication Data
US 2016/0102438 A1 Apr. 14, 2016

(51) Int. Cl.
*E01C 19/00* (2006.01)
*E01C 19/28* (2006.01)
(Continued)

(52) U.S. Cl.
CPC ............ *E01C 19/286* (2013.01); *B06B 1/162* (2013.01); *E02D 3/074* (2013.01); *F16C 3/28* (2013.01)

(58) Field of Classification Search
CPC ....... E01C 19/286; E02D 3/074; B06B 1/162; F16C 3/28
(Continued)

(56) References Cited

U.S. PATENT DOCUMENTS 3,395,626 A * 8/1968 Garis .................... E01C 19/282
404/117
4,342,523 A 8/1982 Salani
(Continued)

FOREIGN PATENT DOCUMENTS

AT 386029 B 6/1988
CH 679051 A5 12/1991
(Continued)

OTHER PUBLICATIONS

European Official Action (Dec. 8, 2016) for corresponding European App. EP13882875.
(Continued)

*Primary Examiner* — Raymond W Addie
(74) *Attorney, Agent, or Firm* — WRB-IP LLP (57) ABSTRACT

An assembly for vibrating a compacting drum of a compacting machine includes a shaft rotatably mountable to a compacting drum of the compacting machine. The center of mass of the shaft is offset from the geometrical rotation axis of the shaft. An outer eccentric member is arranged outside of the shaft, wherein the center of mass of the outer eccentric member is offset from the geometrical rotation axis of the shaft. The outer eccentric member is displaceably mounted relative to the shaft for adjustment of the eccentricity of the assembly. An extension of the outer eccentric member in a direction parallel with the geometrical rotation axis of the shaft is at least two times an average extension of the outer eccentric member in a radial direction perpendicular to the geometrical rotation axis of shaft such that a mass of the outer eccentric member forms a distributed load along the geometrical rotation axis of the shaft.

36 Claims, 5 Drawing Sheets (51) Int. Cl.
   *B06B 1/16* (2006.01)
   *E02D 3/074* (2006.01)
   *F16C 3/28* (2006.01)
(58) Field of Classification Search
   USPC .................................................. 404/117, 113
   See application file for complete search history.

(56) References Cited

U.S. PATENT DOCUMENTS

| | | | | |
|---|---|---|---|---|
| 4,367,054 | A | | 1/1983 | Salani et al. |
| 4,568,218 | A | * | 2/1986 | Orzal ...................... B06B 1/161 |
| | | | | 404/117 |
| 4,759,659 | A | * | 7/1988 | Copie ...................... B06B 1/165 |
| | | | | 366/125 |
| 4,830,534 | A | * | 5/1989 | Schmelzer .............. B06B 1/164 |
| | | | | 404/117 |
| 6,224,293 | B1 | * | 5/2001 | Smith ...................... B06B 1/164 |
| | | | | 404/117 |
| 9,334,621 | B2 | * | 5/2016 | Persson ...................... F16C 3/18 |
| 2003/0012602 | A1 | * | 1/2003 | Meyers ................. E01C 19/286 |
| | | | | 404/117 |
| 2004/0005191 | A1 | * | 1/2004 | Geier .................... E01C 19/286 |
| | | | | 404/117 |
| 2004/0182185 | A1 | | 9/2004 | Niglov |
| 2011/0290048 | A1 | * | 12/2011 | Stein ..................... E01C 19/286 |
| | | | | 74/61 |

FOREIGN PATENT DOCUMENTS

| | | |
|---|---|---|
| DE | 6600344 U | 1/1969 |
| EP | 0847810 A | 6/1998 |
| EP | 1460178 A | 9/2004 |

OTHER PUBLICATIONS

International Search Report (Feb. 6, 2014) for corresponding International App. PCT/SE2013/000056.
International Preliminary Report on Patentability (Jul. 17, 2015) for corresponding International App. PCT/SE2013/000056.

* cited by examiner

ASSEMBLY FOR VIBRATING A COMPACTING DRUM OF A COMPACTING MACHINE

BACKGROUND AND SUMMARY

This disclosure relates to an assembly for vibrating a compacting drum of a compacting machine, the assembly comprising a shaft rotatably mountable to a compacting drum of the compacting machine, the centre of mass of the shaft being offset from the geometrical rotation axis of the shaft, an outer eccentric member being arranged outside of the shaft, and the centre of mass of the outer eccentric member being offset from the geometrical rotation axis of the shaft, and the outer eccentric member being displaceably mounted relative to the shah for adjustment of the eccentricity of the assembly. The disclosure also relates to a compacting machine comprising a frame, at least one compacting drum rotatably connected to the frame, as well as the previously mentioned assembly being mounted to the compacting drum.

The disclosure relates to an assembly for vibrating a compacting machine for compaction of materials, in particular in earthwork and road construction. Document US20040182185A1 shows an adjusting device for regulating the eccentric moment of an eccentric shaft of a roller drum. The shown device shows an inner eccentric shaft being rotationally powered by a motor and an outer eccentric shaft being, rotatable relative to the inner eccentric shaft. The outer eccentric shaft comprises two axially spaced apart eccentric weights that may be used for variably adjusting the resulting total mass eccentricity of the assembly. Consequently, desired vibration amplitude may nearly always be selected from a relatively wide range of vibratory amplitudes.

A disadvantage of the solution of D1 is a relatively high power demand of the driving motor.

There is thus a need for an improved assembly for vibrating a compacting machine removing the above mentioned disadvantage.

It is desirable to provide an assembly for a compacting drum of a compacting machine, where the previously mentioned problem is at least partly avoided.

The disclosure concerns an assembly for vibrating a compacting drum of a compacting machine, the assembly comprising a shaft rotatably mountable to a compacting drum of the compacting machine, the centre of mass of the shaft being offset from the geometrical rotation axis of the shaft, and an outer eccentric member arranged outside of the shaft, the centre of mass of the outer eccentric, member being offset from the geometrical rotation axis of the shaft, and the outer eccentric member being displaceably mounted relative to the shaft for adjustment of the eccentricity of the assembly The disclosure is characterized in an extension of the outer eccentric member in a direction parallel with the geometrical rotation axis of the shaft is at least two times an average extension of the outer eccentric member in a radial direction perpendicular to the geometrical rotation axis of shaft such that a mass of the outer eccentric member forms a distributed load along the geometrical rotation axis of the shaft.

The selected relationship between the axial extension of the outer eccentric member and the average extension of the outer eccentric member in a radial direction results in a certain level of axial mass distribution of the outer eccentric member. By distributing the mass of the outer eccentric member in the direction of the geometrical rotation axis of the shaft the assembly, also referred to as axial direction hereinafter, the moment of inertia of the outer eccentric member is reduced. This reduction in moment of inertia is the result of a reduced distance (D) between the geometrical rotation axis of the outer eccentric member and the centre of weight of the outer eccentric member in a plane perpendicular to the axial direction. The moment of inertia (I) of the outer eccentric member equals the product of the mass (M) and said distance (D) squared, i.e $I=M \times D^2$. Hence, by reducing the distance the moment of inertia is reduced. A reduced distance between the geometrical rotation axis of the outer eccentric member and the centre of weight of the outer eccentric member in a plane perpendicular to the axial direction naturally also results in reduced eccentricity of the outer eccentric, member, where the eccentricity is the product of the mass (M) and said distance (D). However, when for example doubling the mass (M) and reducing the distance (D) by half, the eccentricity has not changed but the moment of inertia is reduced due to the squared distance ($D^2$) in the moment of inertia calculation. As a result, by distributing the mass of the outer eccentric member in the axial direction, the moment of inertia may be reduced while the eccentricity of the outer eccentric member is kept constant.

A reduced moment of inertia of the outer eccentric member results in a reduced moment of inertia of the complete assembly when nothing else has been changed, and this allows a reduced power output of the motor that is used for rotating the assembly while the rotational acceleration remains unchanged. A reduced power output demand of the motor allows a correspondingly smaller motor power, which consequently requires less power output of the main power source of the compacting machine. For example, a smaller hydraulic motor for powering the eccentric assembly allows a reduced hydraulic power output of the hydraulic pump driving the hydraulic motor. As a result, the main diesel engine powering the hydraulic pump may have a reduced maximal power output, and thus reduced fuel consumption. In all, the solution of the disclosure allows reduced fuel consumption.

Further advantages can be achieved. For example, the extension of the outer eccentric member in the direction parallel with the geometrical rotation axis of the shaft may be at least three times, preferably at least five times, and more preferably at least ten times the average extension of the outer eccentric member in the radial direction perpendicular to the geometrical rotation axis of the shaft. A more distributed load and a shorter radial distance between the load and the centre of rotation of the shaft results in further reduced moment of inertia.

The outer eccentric, member may have an extension in the direction parallel with the geometrical rotation axis of the shaft exceeding 10%, preferably exceeding 20%, and more preferably exceeding 50% of the unsupported length of the shaft. As described above, a more distributed load results in that the centre of mass of the eccentric member can be located closer to the rotational axis of the shaft, and thereby reducing the moment of inertia for a given mass.

The outer eccentric member may have an extension in the direction parallel with the geometrical rotation axis of the shaft exceeding 10%, preferably exceeding 20%, and more preferably exceeding 50% of the length of an eccentric mass of the shaft.

The outer eccentric member may exhibit an axial length of at least 100 millimeters, preferably at least 150 millimeters, and more preferably at least 200 millimeters. A distributed load of the eccentric member yield advantageous aspects in terms of energy efficiency.

The outer eccentric member may be pivotally mounted relative to the shaft. This arrangement enables a robust design and cost-effective manufacturing of the assembly.

The mass of any axial segment of an unsupported axial length of the outer eccentric member may differ less than 75% from the mass of any other axial segment of the unsupported axial length of the outer eccentric member with the same axial length, preferably less than 50%, and more preferably less than 40%. A more evenly distributed mass over the length of the eccentric member enables reduced moment of inertia of the eccentric member.

The mass of the unsupported axial length of the outer eccentric member is substantially regularly distributed over the unsupported axial length of the outer eccentric member. A more evenly distributed mass over the length of the eccentric member enables reduced moment of inertia of the eccentric member.

The outer eccentric member is attached to the shaft by means of at least two support members, said at least two support members being spaced apart in a direction of the geometrical rotation axis of the shaft and pivotally mounted on the exterior of the shaft. This arrangement enables a reliable and robust rotatable mounting of the outer eccentric member to the shaft. The rotatable mounting may be realised by relatively narrow roller or sliding bearings, thereby enabling low maintenance costs and high reliability.

Each support member may be formed as an individual member that connects the outer eccentric member with the shaft. This design enables cost-effective manufacturing.

One support member may be positioned on each side of an eccentric mass of the shaft. This layout enables a robust design.

The outer eccentric member is rotatable relative to the shaft in an angular range that is limited by a first end position at a first end of the range and a second end position at a second end of the range, which angular range is less than 360 degrees, preferably less than 180 degrees. 180 degrees appears to represent the largest possible difference in total assembly eccentricity between the first and second end positions, where the eccentricity of the shaft and the outer eccentric member match in one of said first or second end positions and are opposite each other in the other of said first or second end positions.

The total centre of mass of the shaft and the outer eccentric member is offset from the geometrical rotation axis of the shaft with a first distance when the outer eccentric member is located in a first end position, and the total centre of mass of the shaft and the outer eccentric member is offset from the geometrical rotation axis of the shaft with a second distance when the outer eccentric member is located in a second end position, wherein the first and second distances are different. This arrangement essentially implies that the assembly exhibits two different levels of eccentricity of the total assembly depending on the position of the outer eccentric member. This is advantageous when compacting different types of material and material layer thickness, wherein eccentricity oldie total assembly may be selected to best fit the specific situation.

The shaft may comprise a first stop arrangement for preventing relative rotation between the shaft and the outer eccentric member in a first angular direction at a first end position, and a second stop arrangement for preventing relative rotation between the shaft and the outer eccentric member in a second angular direction, opposite to the first angular direction, at the second end position. The first and second stop arrangements allow selection of the total assembly eccentricity simply by means of rotating the shaft in a first direction or a second direction. This arrangement enables a particularly robust and reliable design of a multi-position eccentric assembly because no moving control and/or actuating members are required to change the eccentricity of the assembly.

The assembly may comprise spring means for damping an impact force that may be generated when the outer eccentric member or the support members is/are brought into contact with the shaft at the first end position and/or the second end position. When the outer eccentric member is located in for example the first end position and the shaft suddenly is powered to rotate in the opposite direction, the outer eccentric member will change angular position relative to the shaft to the other end position. Depending on the acceleration of the shaft, the outer eccentric member will arrive at the other end position having angular speed that is different from the angular speed of the shaft, such that a sudden change in angular speed of the outer eccentric member will occur. The moment of inertia in combination with a sudden change in angular speed may result in a relatively high contact force between the outer eccentric member and the shaft, and this force must be absorbed without damaging the assembly. Previously, this was realised by forming the parts of the assembly relatively strong and robust such that the impact force could be absorbed without damages. However, strong and robust parts imply a high moment of inertia, which implies a relatively high power output of the motor for rotationally powering the assembly, thereby resulting in high fuel consumption of the compacting machine. By providing the assembly with spring means for clamping the impact force the parts of the assembly, in particular the shaft and the outer eccentric member may be less strong and robust, such that a reduced moment of inertia results, and thereby also reducing the fuel consumption.

The spring means may be arranged on the outer eccentric member, in particular at the end regions of the outer eccentric member. Alternatively, the spring means may be arranged on the shaft, in particular at the end regions of the shaft. Still alternatively, the spring means may be arranged on one or more of said at least two support members.

The spring means may comprise at least one spring member in form of helical spring, disc spring, elastic member, or the like.

The spring means itself may be arranged to directly contact the shaft and the outer eccentric member for absorbing impact energy upon impact. This arrangement corresponds to a relative simple and cost-effective solution. Alternatively, the spring means may additionally comprise at least one abutment member arranged to transfer the impact energy to the spring member. The abutment member may be arranged to prevent damages to the spring member, and/or simplifying guidance of the spring means for preventing the spring means from unwanted deformation.

The at least one abutment member may cooperate with guiding means for guiding the at least one abutment member along a path, wherein the guiding means preferably is formed of at least one recess in which the at least one abutment member is at least partly slidingly positioned. Guiding means of the abutment member may enable guidance of the spring means for preventing the spring means from unwanted deformation.

The at least one spring member may be installed in a preloaded state, i.e in a compressed state. This arrangement enables a higher damping force from the very beginning of the motion path upon impact, and prevents loose parts in the assembly. The preloaded spring member may also enable a preloaded mounting of the outer eccentric member within the support members.

The at least one recess may be a through-hole, a first abutment member may be arranged at a first end of the through-hole, a second abutment member may be arranged at a second end of the through-hole, and the spring member may be arranged between the first and second abutment member. This arrangement allows damping means being located on both sides of a member, such as the outer eccentric member of support member. Hence, a single recess and a single spring member may be used for realising damping means on both sides of the member, thereby reducing costs.

The spring means may be positioned in a central region of the outer eccentric member and/or the shaft. This arrangement results in less spring means, thereby reducing cost. For example, the outer eccentric member may be constituted by at least one leaf spring, and the shaft may comprise at least one abutment surface positioned in a central region of the shaft, and the leaf spring may be arranged to interact with the abutment surface for damping the impact force.

The outer eccentric member may be constituted by at least one leaf spring, and the shaft comprises at least one projecting abutment member positioned in a central region of the shaft, and the leaf spring is arranged to interact with the projecting abutment member for damping the impact force. This arrangement defines an alternative solution for damping the impact force.

The outer eccentric member lay be constituted by at least one metal bar that is fastened to the at least two support members. This arrangement enables a cost-effective solution.

The outer eccentric, member may be constituted by at least two metal bars that are inserted in a recess in at least two support members, and the at least two metal bars are fastened to each of the support members by means of spring means that presses apart the at least two metal bars, such that each of at least two metal bar abuts an opposing inner surface of the recess of the at least two support members. This arrangement enables a rattle-free and fast mounting of the outer eccentric member, thereby simplifying manufacturing of the assembly.

The shaft may over a majority of its axial extension have substantially a cross-sectional circular segment shape in a plane perpendicular to the geometrical rotation axis of the shaft, wherein the circular segment has a central angle of more than 90 degrees, and preferably more than 120 degrees. It has been found that the shaft is provided with a particularly low moment of inertia in combination with a high eccentricity when the shaft and outer eccentric member jointly exhibits a circular cross-sectional area in a plane perpendicular to the axial direction, wherein a periphery of the circle crosses the geometrical centre of rotation of the shaft.

A majority of the mass of the outer eccentric member in a first end position may be located inside a geometrical cross-sectional circle in a plane perpendicular to the geometrical rotation axis of the shaft, which circle has the same centre and same radius as the circular segment. As mentioned above, it has been found that the shaft is provided with a particularly low moment of inertia in combination with a high eccentricity when the shaft and outer eccentric member jointly exhibits a circular cross-sectional area in a plane perpendicular to the axial direction, wherein a periphery of the circle crosses the geometrical centre of rotation of the shaft.

The geometrical rotation axis of the shaft may be positioned within, on or outside a geometrical cross-sectional circle in a plane perpendicular to the geometrical rotation axis of the shaft, which circle has the same centre and same radius as the circular segment.

The geometrical cross-sectional circle extends within a distance from the geometrical rotation axis of the shaft, which distance is in the range of 0-50 millimeters, preferably 0-25 millimeters, and more preferably 0-10 millimeters. As mentioned above, it has been found that the shaft is provided with a particularly low moment of inertia in combination with a high eccentricity when the shaft and outer eccentric member jointly exhibits a circular cross-sectional area in a plane perpendicular to the axial direction, wherein a periphery of the circle crosses the geometrical centre of rotation of the shaft. However, also when the periphery of the circle is located relatively close to the centre of rotation a significant reduction in moment of inertia is achieved.

Each support member may be formed by a connecting rod. This enables a reduced moment of inertia.

The shaft may be a solid shaft. A solid shaft without an internal cavity enables a reduced moment of inertia of the assembly.

The disclosure also relates to a compacting machine that comprises a frame and at least one compacting drum according to the disclosure rotatably connected to the frame.

The compacting machine may further comprise a motor for rotationally driving the assembly in any rotational direction, wherein the assembly may be rotationally mounted in two spaced apart parallel supports that are fastened to an interior wall of the compacting drum, which supports are configured to transfer vibrations generated by the assembly to the compacting drum.

BRIEF DESCRIPTION OF DRAWINGS

In the detailed description of the disclosure given below reference is made to the following figure, in which.

DETAILED DESCRIPTION

Various aspects of the disclosure will hereinafter be described in conjunction with the appended drawings to illustrate and not to limit the disclosure, wherein like designations denote like elements, and variations of the disclosed aspects are not restricted to the specifically shown embodiments, but are applicable on other variations of the disclosure.

Vibratory steel drums exert forces which increase compactive effort. Vibratory drums have internal eccentric weights that rotate on a shaft. The rotating eccentric weight causes the drum to move in all directions but the effective part is the up and down movement. Vibratory forces are the rapid up and down movements which cause aggregates and soil particles to move. Aggregates in motion tend to re-orient themselves easier so the material compacts easier under the weight of the drum. Vibration is a particularly effective tool for the aggregate or particulate material like sand and gravel. A relatively large compacting machine typically comprises a frame, a front compacting drum and a rear compacting drum rotatable connected to the frame. The machine may further comprise a motor for rotationally driving, an assembly for vibrating the compacting machine, and in particular for vibrating the front and/or rear compacting drum. The machine may have a static weight of about 10 000 kg, such that each drum exerts a static weight of about 5000 kg. In addition to the static weight, each vibratory drum may exert a dynamic weight of about 12 000 kg merely caused by the centrifugal forces generated by an eccentric rotating assembly positioned within each vibratory compacting drum. Hence, to total effective compacting weight may typically add up to about 17 000 kg. This example clearly shows the advantage of providing the compacting drum with a rotating vibratory assembly.

Figure 1:
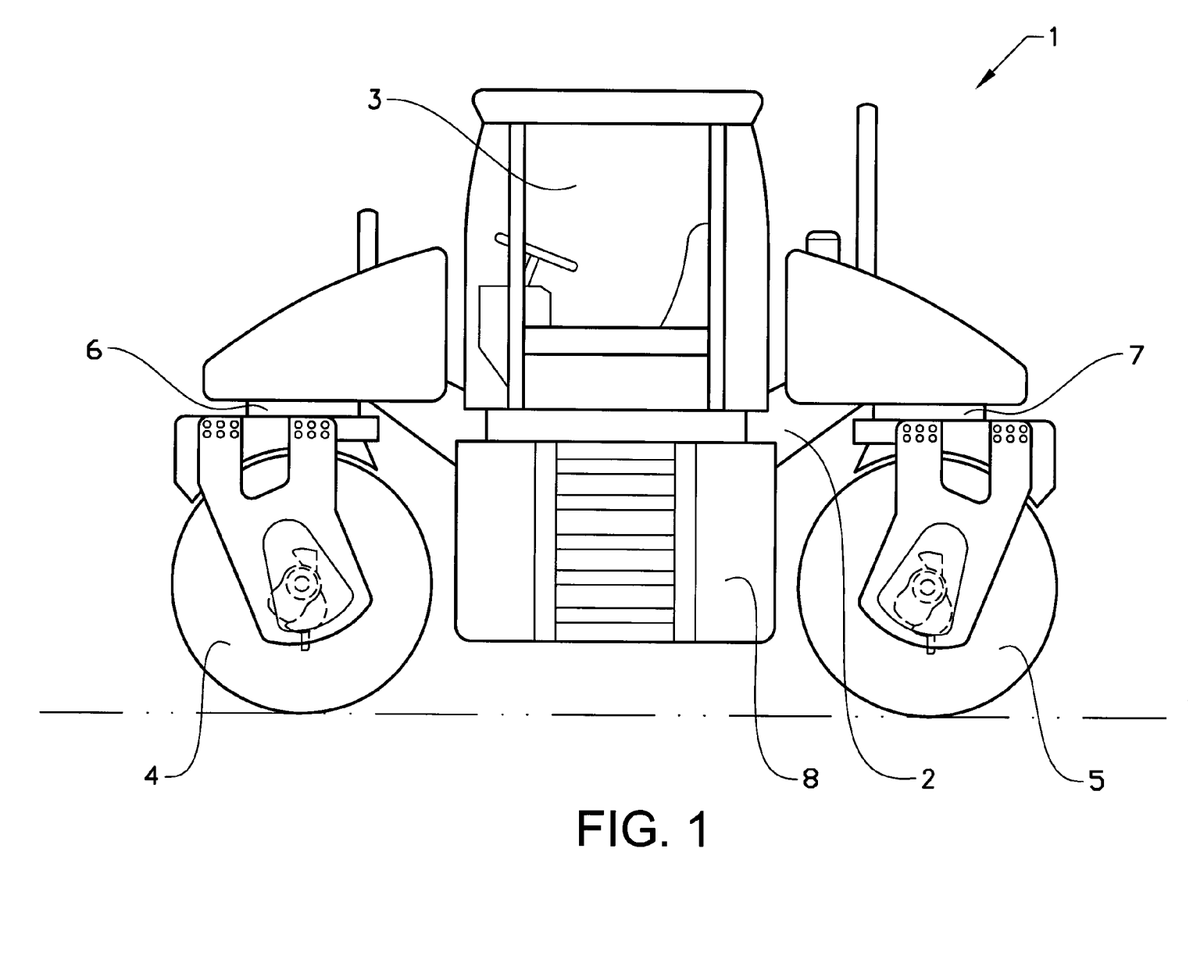
FIG. 1 shows a compacting machine.

FIG. 1 shows a tandem compaction machine 1 that comprises a frame 2 with driver's cab 3, a front compacting drum 4 and a rear compacting drum 5 each being mounted via a steerable swivel coupling 6, 7 at the front and rear underneath said frame 2 respectively. Situated between the two compacting drums 4, 5 is an engine compartment 8 which houses a drive engine, usually a diesel engine. Although the disclosure is focused on a compaction machine having two compacting drums and a driver's cabin, the disclosure is equally applicable to compacting machines having a single compacting drum and/or compacting machines that are pulled or pushed by other objects, such as a tractor or a human operator.

Figure 2:
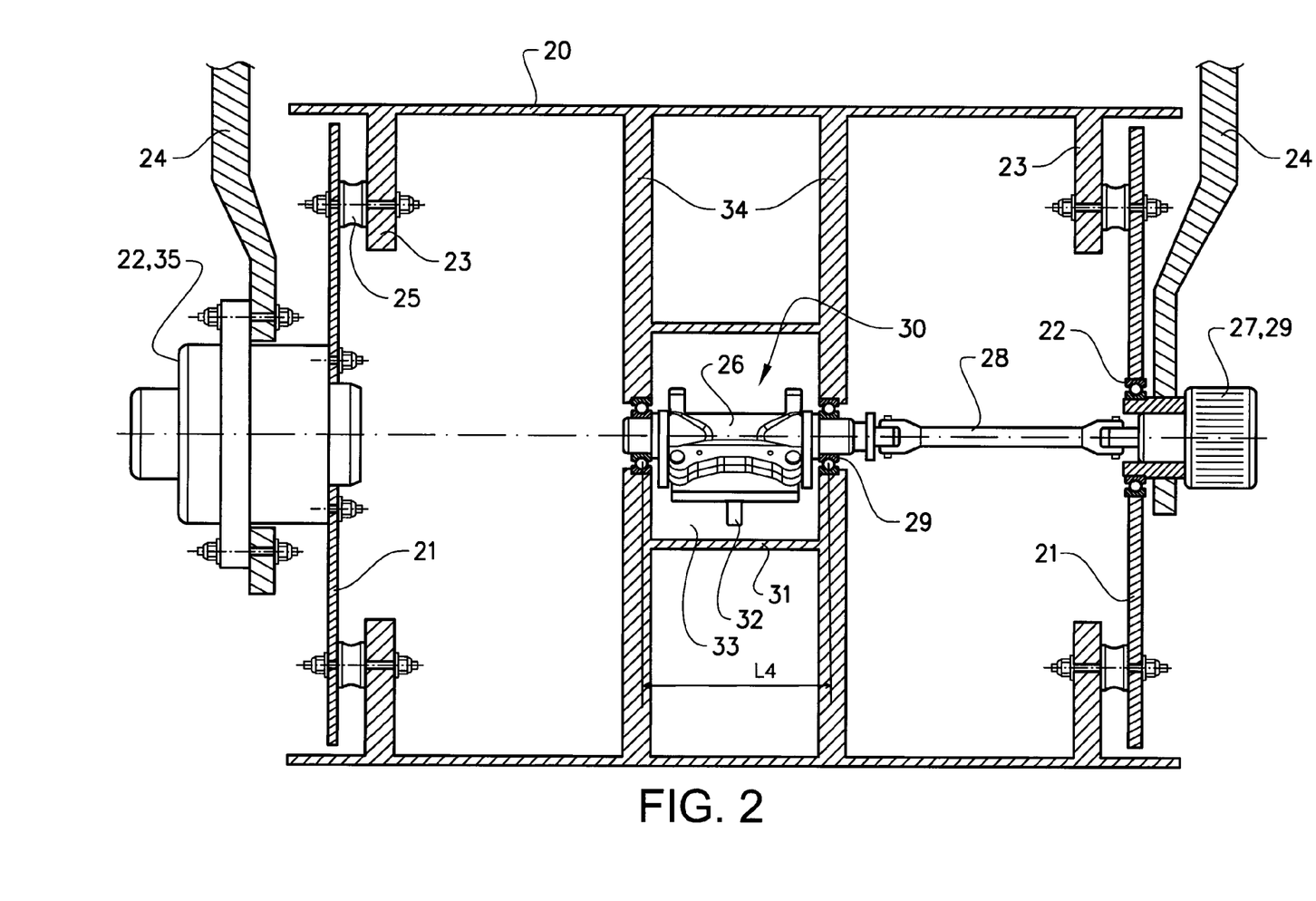
FIG. 2 shows a cross-sectional view of a compacting drum comprising an assembly for vibrating the machine.

FIG. 2 shows a schematic and simplified cross-sectional view of one of the compacting drums 4, 5. The compacting drum 4, 5 comprises a cylindrical wall 20 that contacts the ground. The cylindrical wall 20 is connected to structural support plates 23 and rotatable mounted by means of two outer radially extending plates 21. The radially extending plates 21 are mounted to the structural support plates 23 via vibration damping elements 25, such as rubber-metal elements. A motor 35, such as hydraulic motor or hydraulic motor combined with a gearbox, is fastened to a frame support member 24 to drive the compacting drum 4, 5 of the compaction machine 1. Bearings 22 are integrated into motor 15 and radially extending plate 21 to allow rotation of the radially extending plates 21 and the cylindrical wall 20 relative to frame support 24 to drive the compaction machine 1.

Situated in the centre of the compacting drum 4, 5 is an assembly 30 for vibrating a compacting machine. A rotatable shaft 26 of the assembly 30 is driven by a motor 27, such as a hydraulic or electric motor, via a driving shaft 28. The shaft 26 being rotatable supported by bearings 29 positioned near end portions of the shaft 28 and axially spaced apart with a distance L4. The unsupported length L4 of the shaft 26 corresponds thus to the axial length L4 of the shaft 26 between the centre of the shaft bearings 29 positioned closest to, and on each side of an eccentric mass of the shaft 26 The driving shaft 28 being connected by means of articulated joints at both ends for allowing the compacting drum 4, 5 to vibrate with a certain amplitude and frequency. A cylindrical wall 31 being mounted surrounding the assembly 30 and forming a lubrication oil reservoir 33 together with two inner radially extending support plates 34, which are in contact with the cylindrical wall 20 and is arranged to transfer vibrations generated by the assembly 30 to the cylindrical wall 20. A splash pin 32 is provided on the shaft 26 and the splash pin 32 and oil fill level are jointly adapted to generate a lubrication oil mist within the reservoir 33 but with only the splash pin 32 being in contact with the liquid, lubrication.

The assembly 30 for vibrating the compacting machine 1 is shown more in detail in FIGS. 3-6. The assembly 30 is arranged to be mounted within at least one compacting drum 4, 5 of the compacting machine and to generate vibrations that are transferred to the cylindrical outer wall 20 of the compacting drum 4, 5. The assembly 30 comprises a shaft 26 that is rotatably mountable to the compacting drum 4, 5, and the centre of mass of the shaft 26 is offset from the geometrical rotation axis of the shaft 26. The assembly 30 further comprises an outer eccentric member 40 being arranged outside of the shaft 26, i.e on the exterior of the shaft 26. The centre of mass of the outer eccentric member 40 is offset from the geometrical rotation axis of the shaft 26. The outer eccentric member 40 is displaceably mounted relative to the shaft 26, in particular pivotally mounted relative to the shaft 26, for adjustment of the eccentricity of the assembly. The outer eccentric member 40 preferably pivots around the centre of rotation of the shaft 26, but the outer eccentric member 40 may alternatively pivot around an axis radially offset from the centre of rotation of the shaft 26. The total, i.e combined centre of mass of the shaft 26 and the outer eccentric member 40 may thus be continuously variable in a certain range merely by changing the internal angular relationship between the shaft 26 and outer eccentric member 40.

Moreover, by rotating the assembly 30 vibrations are generated due to the eccentric centre of mass of the assembly 30. The vibrations are caused by the centrifugal force $F_c$ which is generated by the eccentric centre of mass upon rotation of the shaft 26, and is calculated by $F_c = D \times M \times \omega^2$, where $F_c$ denotes centrifugal force in Newton, D denotes distance between centre of rotation and centre of mass of the rotating assembly 30, M denotes the total mass in kg of the rotating assembly 30, and $\omega^2$ denotes squared angular velocity in radians/second. The product of the mass M and distance D is sometimes referred to as the unbalance of the construction. The compacting drum 4, 5 will exhibit a circular oscillation motion when the assembly 30 is rotated. The amplitude and frequency of the oscillation motion being dependent on the rotating speed of the assembly 30 and the generated centrifugal force $F_c$.

The extension of the outer eccentric member 40 in a direction parallel with the geometrical rotation axis of the shaft 26 is at least two times the extension of the outer eccentric member 40 in a radial direction perpendicular to the geometrical rotation axis of shaft 26. This relationship is selected to ensure that the mass of the outer eccentric member 40 forms a distributed load along, the geometrical rotation axis of the shaft 26, whereby it is assumed that the mass of the eccentric member 40 is distributed more or less evenly over the axial length of the eccentric member 40. The distributed load and the geometrical form of the assembly 30 aims at achieving a low moment of inertia while having a sufficiently high level of unbalance, as described above. An assembly having for example one or two eccentric weights each acting as a point load results in a higher moment of inertia, and requires therefore higher power output of the assembly driving motor 27 for accelerating the assembly 30 with a similar acceleration.

Figure 3:
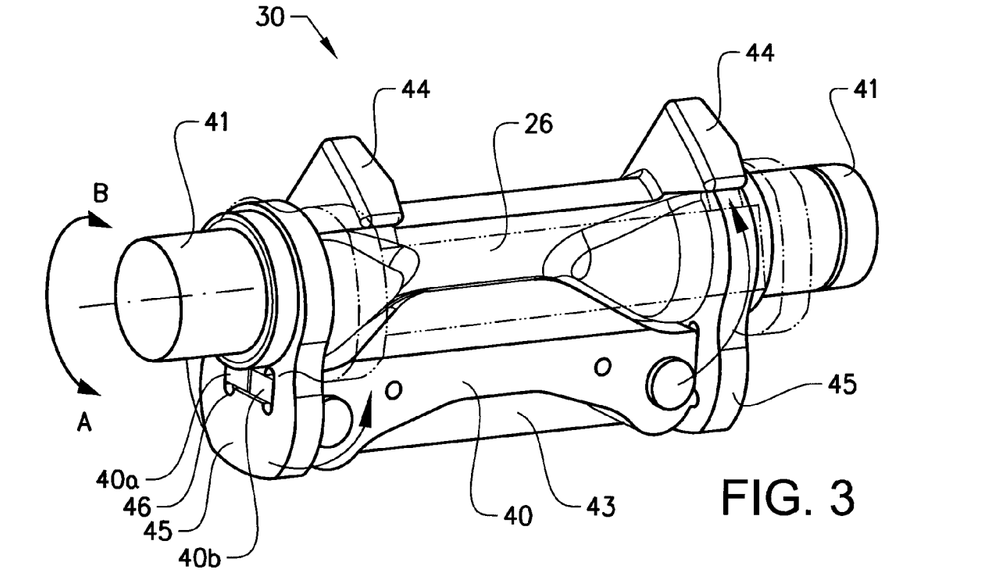
FIG. 3 shows a front perspective view of the assembly for vibrating the machine.
Figure 4:
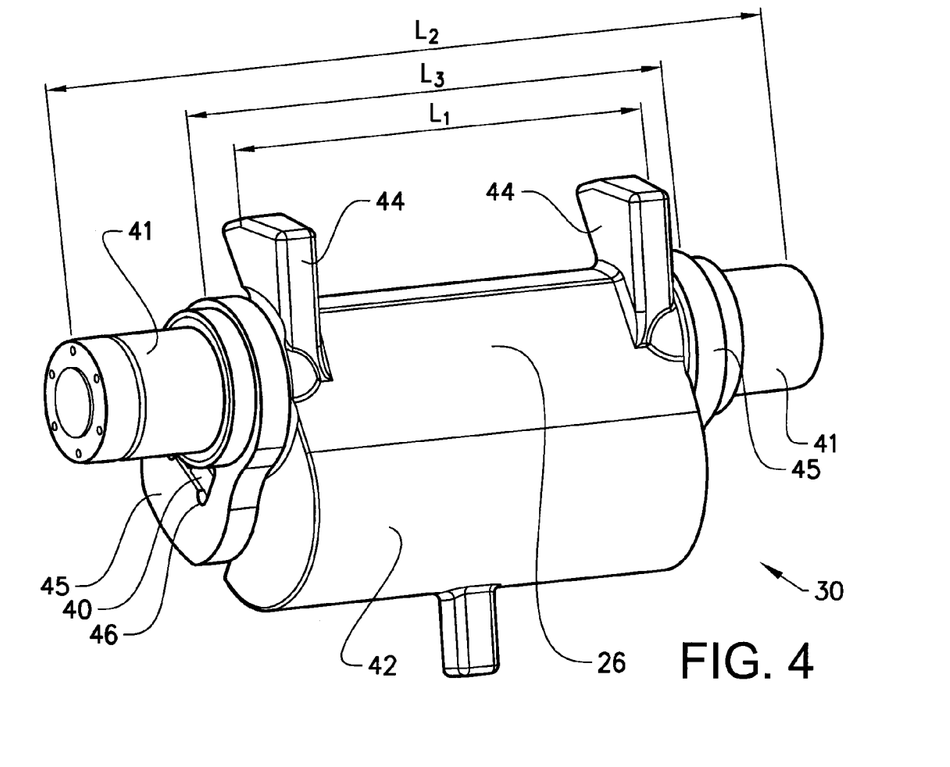
FIG. 4 shows a rear perspective view of the assembly for vibrating the machine.

FIG. 3 and FIG. 4 shows a first embodiment of the assembly 30 from a front and back perspective view respectively. The extension of the outer eccentric member 40 in a direction parallel with the geometrical rotation axis of the shaft 26 is referred to as $L_3$ in FIG. 4, and represents the maximal axial extension of the eccentric member 40. The average extension of the outer eccentric member 40 in a radial direction is defined as the average distance from a centre of rotation of the shaft 26 to the maximal radial extension of the eccentric member 40 over the axial length of the eccentric member 40. The shaft 26 is solid and may for example be made of cast metal. The shaft 26 comprises bearing support surfaces 41 at axial end regions of the shall 26. The bearing support surfaces 41 carries, when assembled in a compacting drum, shall bearings that enable rotatable mounting of the shaft 26 in the compacting drum 4, 5. The shaft 26 is thus freely rotatable within the drum 4, 5. An eccentric mass 42 is integrally provided at a central region of the shaft 26. The eccentric mass is axially distributed over a length which is preferably positioned centred with respect to the axial extension $L_3$ of the outer eccentric member 40. For example, the axial extension of the eccentric mass 42 of the shaft 26 may be at least 100 millimeters, preferably at least 150 millimeters, and more preferably at least 200 millimeters. Furthermore, the axial extension 1_i of the eccentric mass 42 of the shaft 26 may correspond to at least 15% of the total length 1_2 of the shaft 26, preferably at least 35% of the total length $L_2$ of the shaft 26, and more preferably at least 55% of the total length $L_2$ of the Shaft 26. The total length 1_2 of the shaft 26 is measured in the axial direction of the shaft and corresponds to the length of the shaft 26 as a single piece. Additional shafts connected to the shaft 26, such as driving shaft 28, are not included when measuring the length of the shaft 26.

The outer eccentric member 40 is rotatable relative to the shaft 26 in an angular range that is limited by a first end position at a first end of the range and a second end position at a second end of the range. The angular range is less than 360 degrees, and preferably less than about 200 degrees for accomplishing a large difference in eccentricity of the assembly 30 between the first and second end positions. The angular range is preferably also not too large since the impact force then risk to be higher because the shaft 26 may accelerate for a longer time period before the first or second end position is reached, such that the shaft 26 potentially will have a higher angular velocity at the time of impact. High impact forces are negative because they may damage the assembly 30. An angular range of about 130-160 degrees may be sufficient. As a result of the first and second end positions within a range less than 360 degrees the outer eccentric member will always rotate with the shaft 26 after a rotation of the shaft 26 in a single direction for more than 360 degrees.

The shaft 26 comprises a first stop arrangement for preventing relative rotation between the shaft 26 and the outer eccentric member 40 in a first angular direction at the first end position, and a second stop arrangement for preventing relative rotation between the shaft 26 and the outer eccentric member 40 in a second angular direction, opposite to the first angular direction, at the second end position. In FIGS. 3 and 4, the outer eccentric member 40 is positioned in the first end position, in which a substantially flat contact surface 43 of the shaft 26 forms the first stop arrangement and functions as abutment surface of the shaft 26 in the first end position of the outer eccentric member 40. The shaft 26 further comprises two projecting abutment members 44 positioned axially spaced apart. The two projecting abutment members 44 form the second stop arrangement and function as abutment surfaces of the shaft 26 in the second end position of the outer eccentric member 40. The second end position is illustrated by the dash-dotted view of the outer eccentric member 40 in FIG. 3. The two projecting abutment members 44 are formed integrally with the shaft 26 and positioned such that they engage axial side portions of the outer eccentric member 40 during contact.

The outer eccentric, member 40 is attached to the shaft 26 by means of two support members 45, which are spaced apart in the axial direction and pivotally mounted on the exterior side of the shaft 26, in particular on the cylindrical end regions 41 of the shaft 26. The spaced apart positioning of the two support members 45 ensures that the mass of the outer eccentric member 40 forms a distributed load and not a point load. For example, the axial extension $L_3$ of the outer eccentric member 40 may be larger than 100 millimeters, preferably larger than 150 millimeters, and more preferably larger than 200 millimeters. Furthermore, the extension L of the outer eccentric member 40 in the direction of the geometrical rotation axis of the shaft corresponds to at least 20% of the total length 1_2 of the shaft in the direction of the geometrical rotation axis of the shaft, preferably at least 40% of the total length $L_2$ of the shaft 26, and more preferably at least 60% of the total length 1_2 of the shaft 26. The axial segment of the eccentric member 40 that is not directly support by the support members 45, i.e located between the support members 45 is hereinafter referred to as an unsupported axial length of the outer eccentric member 40 and corresponds in the embodiment of FIG. 2 to the distance Each of the support members 45 has preferably the shape of a connecting rod. This shape contributes to the eccentricity of the outer eccentric member 40.

Figure 5:
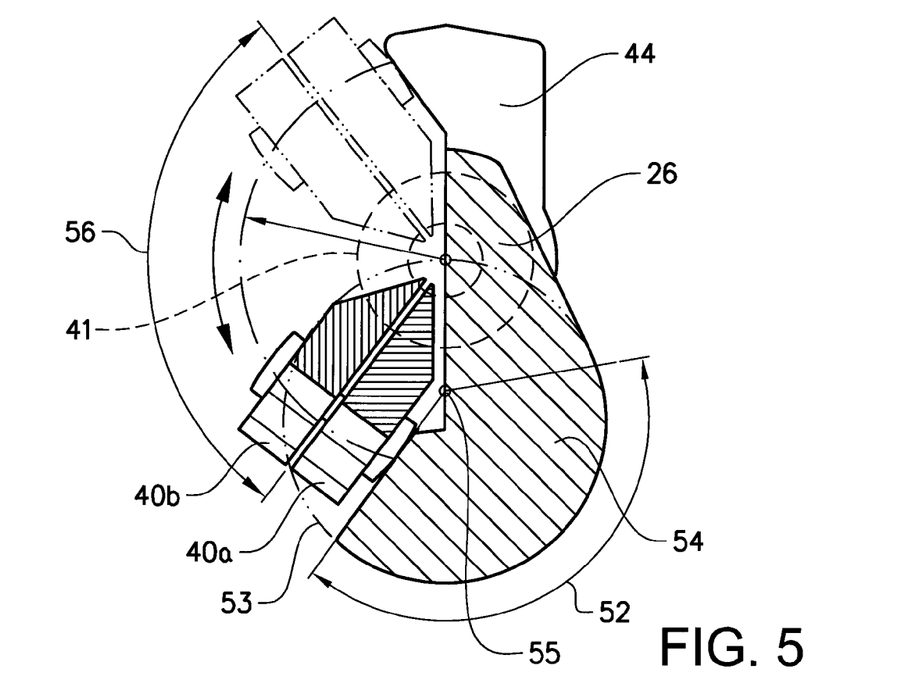
FIG. 5 shows a cross-sectional view in an axial direction of the assembly.

The outer eccentric member 40 may be fastened to two support members 45 in a variety of ways, such as welding or by fasteners, but a positive interlocking of the outer eccentric member 40 and the support members 45 is advantageous from a safety aspect. In the embodiment of FIGS. 3 and 4, each of the support members 45 is provided with recess 46 or through-hole, in which the outer eccentric member 40 may be inserted and secured. In the specific embodiment shown, the outer eccentric member 40 is constituted by two metal bars 40a, 40b that are inserted in the recess 46 of each support member 45. The two metal bars 40a, 40b are fastened to each of the support members 45 by means of preloaded spring means 47 that presses apart the two metal bars 40a, 40b, such that each of the two metal bars 40a, 40b abuts an opposing inner surface of the recess 46 of the two support members 45. This specific solution enables a Gist assembly of the outer eccentric member 40 to the support members 45, namely by pressing the two bars 40a, 40b together, inserting the end thereof into the recess 46 and allowing the bars 40a, 40b to separate and contact opposite surfaces of the recess 46 under the force of the still compressed spring means 47. FIG. 5 shows a cross-section of the spring means 47 of this embodiment in combination with abutment members 48, which will be described more in detail below. The spring means 47 is here a plurality of stacked spring discs, but other solutions are possible, such as one or more helical springs, elastic materials, etc. The outer eccentric member 40 is formed of one or more parts that jointly form a single united member.

From the description above, it is clear that the outer eccentric member 40 has two stable positions. The first end position, as illustrated with solid lines in FIG. 5, and the second end position, as illustrated with the dash-dotted view of the bars 40a, 40b in FIG. 5. Typically, the angular rotatable range 56 of the outer eccentric member is about 90-135 degrees. The outer eccentric member 40 will swing to the first or second end position upon rotation of the shaft 26 in a specific direction by means of the motor 27. If the outer eccentric member 40 initially hangs freely inbetween the first and second end positions and the shaft 26 is not rotating, and the motor 27 starts to rotate the shaft 26 in a first direction A, as illustrated in FIG. 3, then the outer eccentric member 40 after a short rotation of the shaft 26, i.e less than 180 degrees, will contact the substantially flat contact surface 43 of the first stop arrangement. This contact position corresponds to the first end position of the outer eccentric member 40. However, if the motor 27 starts to rotate the shaft 26 in a second direction B, then the outer eccentric member 40 after a short rotation of the shaft 26 will contact the two projecting abutment members 44 of the second stop arrangement. This contact position corresponds to the second end position of the outer eccentric member 40. After the outer eccentric member 40 has reached and settled at the first or second end position and the shaft 26 continues rotating with a minimum speed, then the outer eccentric member 40 will remain at said position. However, if the shaft 26 begins to decelerate or if the rotational velocity of the shaft 26 is too low then the outer eccentric member 40 will not remain at the end position. Normally, the motor 27 is set to rotate the shaft 26 with a fixed speed of about 1000-4000 rpm, and preferably about 2000-3000 rpm. With such high angular velocity the outer eccentric member 40 will remain fixed at any end position depending on the angular direction of the shaft 26.

The total centre of mass of the shaft 26 and the outer eccentric member 40 is offset from the geometrical rotation axis of the shaft 26 with a first distance when the outer eccentric member 40 is located in a first end position, and the total centre of mass of the shaft 26 and the outer eccentric member 40 is offset from the geometrical rotation axis of the shaft 26 with a second distance when the outer eccentric member 40 is located in a second end position, wherein the first and second distances are different. The assembly 30 may thus be set to generate vibrations with two different amplitudes depending on the direction of rotation of the shaft 26, given a fixed rotation speed of the shaft 26. The two predetermined vibration modes may be selected by an operator of the compacting machine by selector means, such as a selector button, touch screen, or the like, installed in the cab.

The operator may thus select between for example a strong and fine vibration mode, or vibration-less operating mode. In the strong vibration mode, the shaft 26 in rotated in direction A, the outer eccentric member 40 is positioned in the first end position, in which the centre of mass of the shaft 26 and the centre of mass of the outer eccentric member 40 are relatively close, i.e with a relatively small angular distance. The total centre of mass of the assembly 30 is thereby relatively largely offset from the geometrical axis of rotation of the shaft 26, such that high amplitude oscillations are generated. In the fine vibration more, the shaft 26 in rotated in direction B, the outer eccentric member 40 is positioned in the second end position, in which the centre of mass of the shaft 26 and the centre of mass of the outer eccentric member 40 are relatively spread apart, i.e with a relatively large angular distance, typically more than 90 degrees. The total centre of mass of the assembly 30 is thereby less offset from the geometrical axis of rotation of the shaft 26, such that low amplitude oscillations are generated. The operator may select if vibration mode should be used, and what vibration mode is deemed suitable. Typically, the drum 4, 5 oscillates with about 1 millimeter, i.e has an amplitude of about a millimeter when the strong vibration mode is selected. This vibration mode is typically used for compacting thicker layers of material. Similarly, the drum 4, 5 oscillates with about 0.5 millimeters when the fine vibration mode is selected. This vibration mode is typically used for compacting thinner layers of material.

It has been found that an optimal combination of low moment of inertia and high eccentricity of the assembly may be attained m an end position of the outer eccentric member 40 when shaping the shaft 26 and outer eccentric member 40 such as to jointly form a circular cylinder that is positioned with its axis parallel with axis of the assembly 30, and with its cylindrical surface passing through the geometrical centre of rotation of the shaft 26. This shape is however difficult to attain due to dimensional and manufacturing cost limitations of the shaft 26 and outer eccentric member 40. FIG. 5 shows a cross-section of the assembly 30 in a plane perpendicular to the axial direction, where the outer eccentric member 40 and shaft 26 have been funned to approach the combined shape that is deemed to be optimal. Here the shaft 26 over a majority of its axial extension has substantially a cross-sectional circular segment shape, wherein the circular segment 54 has a central angle 52 of more than 90 degrees, and preferably more than 120 degrees. A larger circular segment 54 corresponds to a better conformity to the desired cylindrical shape. Furthermore, a majority of the mass of the outer eccentric member 40 in the tint end position is located inside the geometrical cross-sectional circle 53 in a plane perpendicular to the geometrical rotation axis of the shaft 26, which circle 53 has the same centre 55 and same radius as the circular segment 54. The radially inner longitudinal portion of the outer eccentric member 40 is even chamfered to better conform to the shape of the shaft 26 as well as to the shape of the geometrical cross-sectional circle. The shape of the shaft 26 and outer eccentric member 40 may of course be shaped to even better jointly conform to the geometrical cross-sectional circle but to a high manufacturing cost. The disclosed form represents a good compromise of low manufacturing costs and high conformity to the desired geometrical cross-sectional circle, in the disclosed embodiment of FIG. 5, the geometrical cross-sectional circle 53 passes through the centre of rotation of the shaft 26, but the circle may alternatively pass inside or outside the centre of rotation offset with a distance in the range of 0-50 millimeters, preferably 0-25 millimeters, and more preferably 0-10 millimeters.

Depending on the acceleration or deceleration of the shaft 26 and the weight of the outer eccentric member 40 a more or less strong impact will occur when the outer eccentric member 40 engages the first and second stop arrangement of the shaft 26. This sudden impact may thus result in relatively large impact forces that must be absorbed b the parts 27, 40, 45, and this may lead to damages to the assembly 30. One solution for preventing damages is to make the shaft 26 and outer eccentric member 40 relatively massive for withstanding elevated impact forces. Massive parts of the assembly 30 however results in increased moment of inertia and therefore increased fuel consumption. A solution that does not require massive dimensions of the assembly is thus desired. The assembly of the present disclosure therefore comprises spring means for damping an impact force that is generated when the outer eccentric member 40 is brought into contact with the shaft 26 at the first end position and the second end position. The spring means is thus arranged to absorb at least part of the impact force.

Figure 6:
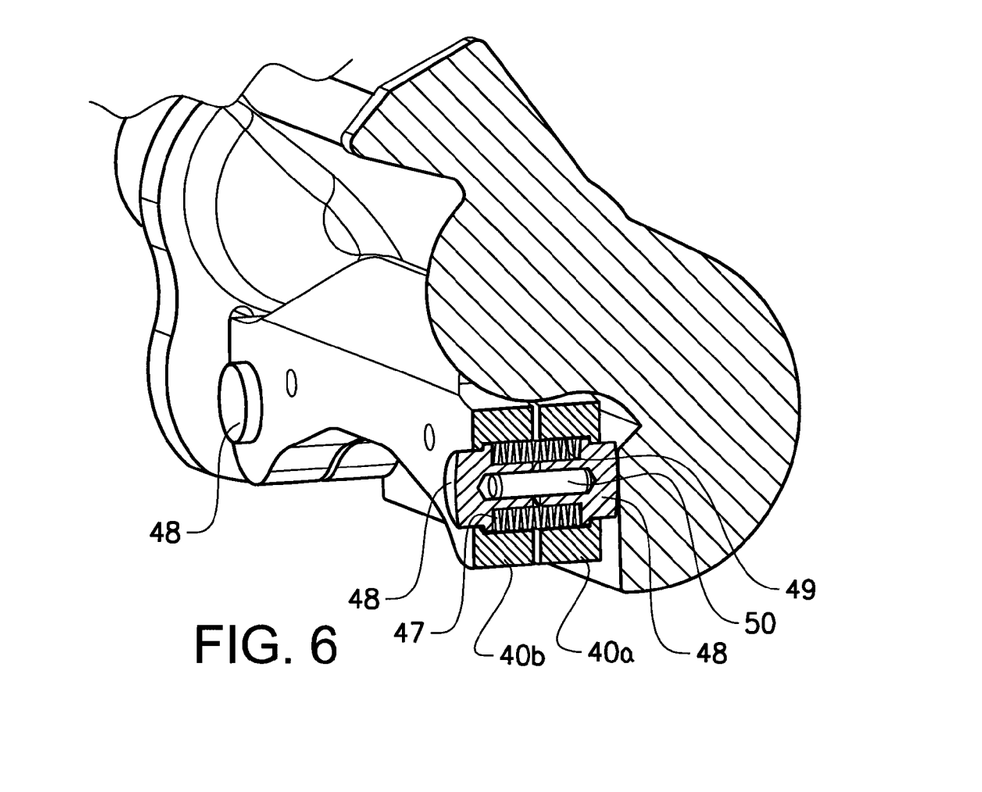
FIG. 6 shows a detailed solution of spring means for damping an impact force.

FIG. 6 shows a detailed solution for accomplishing damping of impact forces according to the first embodiment of the disclosure. Here the spring means 47 is arranged at the end regions of the outer eccentric member 40 in locations that correspond to the locations of the two projecting abutment members 44. Two spaced apart impact locations allow the impact force to be divided between the two impact locations. The impact damping means is here combined with the fastening means of the outer eccentric member 40 to the support members 45 for reducing number of parts of the assembly 30. The spring means 47 comprises a plurality of spring members in form of stacked disc springs that are preloaded arranged between two abutment members 48 that are arranged to transfer the impact force to the spring member. The spring members themselves therefore do not contact the shaft 26 in this embodiment. The abutment members 48 are positioned in a through-hole 49 in the outer eccentric member 40 and prevented from escaping by means of a flange of the outer eccentric member 40 that engage a flange of the abutment member 48. Two such abutment members 48 are installed in the outer eccentric member 40 facing opposite directions, and the spring members are securely located within the through-hole 49 between the two abutment members 48. A central common guidance pin 50 is also slidingly provided centrally within the abutment members 48 for together with the through-hole 49 form guiding means that prevent the abutment members 48 from tilting inside the through-hole 49. The preloaded spring members ensure that the abutment members 48 are always in a protruding position when in non-contact state. The abutment members 48 are arranged to abut either the flat contact surface 43 of the first stop arrangement, as shown in FIG. 6, or the two projecting abutment members 44 of the second stop arrangement.

The spring means 47 may alternatively be formed without abutment members 48 and with the spring member itself contacting the shaft 26 (non-showed). The spring means 47 may still alternatively be positioned on the shaft 26 (non-showed), preferably at locations of the shaft 26 that corresponds to the end regions of the eccentric assembly 30. Still more alternatively, the spring means 47 may be arranged on one or both of the support members 45 (non-showed). Still more alternatively, the spring means 47 may comprise one or more elastic damping member (non-showed) that functions as impact damper. The elastic damping member does not even require a recess but may be secured to the outer surface of at least one of the outer eccentric member 40, shaft 26 or support members 45 by adhesive, threaded members, riveting, or the like.

Figure 7:
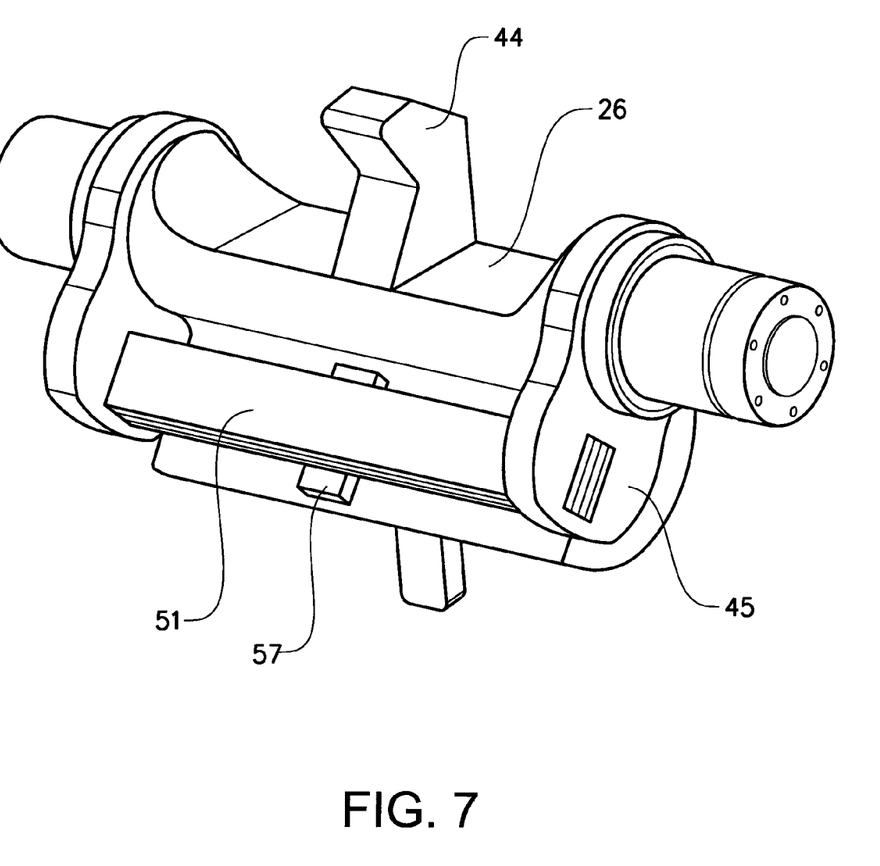
FIG. 7 shows an alternative embodiment of the assembly.

Furthermore, the spring means 47 may still alternatively be positioned in a central region of the outer eccentric member 40 and/or the shaft 26. This may reduce the lumber of spring means installations, and the shaft 26 may then be provided with a single centrally positioned projecting abutment member 44. FIG. 7 shows an embodiment having single centrally positioned projecting abutment member 44. The spring means 47 is here constituted by the outer eccentric member 40 itself, which is formed of one or more leaf springs that are fastened to the support members 45 and arranged to interact with the centrally positioned projecting abutment member 44 for damping the impact force. A corresponding centrally positioned projecting abutment surface 57 may be provided on the flat abutment surface 43. The spring means 47 may alternatively be formed by centrally arranged separate spring members with or without abutment members, similar to previously shown solutions.

The detailed disclosure involves a few variations in design but many more variations are included in the scope of protection as defined by the claims. The outer eccentric member 40 and/or shaft 26 may for example be formed by single or multiple parts and their shape may be modified to better conform to the geometrical circle passing through the centre of rotation. More than two rotatable support members 45 may also be used for securing the outer eccentric member 40 to the shaft 26.

Reference signs mentioned in the claims should not be seen as limiting the extent of the matter protected by the claims, and their sole function is to make claims easier to understand. As will be realised, the disclosure is capable of modification in various obvious respects, all without departing from the scope of the appended claims. Accordingly, the drawings and the description thereto are to be regarded as illustrative in nature, and not restrictive.

The invention claimed is:

1. An assembly for vibrating a compacting drum of a compacting machine, the assembly comprising a shaft rotatably mountable to a compacting drum of the compacting machine, the centre of mass of the shaft being offset from the geometrical rotation axis of the shaft, and an outer eccentric member separate from the shaft, the centre of mass of the outer eccentric member being offset from the geometrical rotation axis of the shaft, and the outer eccentric member being displaceably mounted relative to the shaft for adjustment of the eccentricity of the assembly, wherein an extension of the outer eccentric member in a direction parallel with the geometrical rotation axis of the shaft is at least two times an average extension of the outer eccentric member in a radial direction perpendicular to the geometrical rotation axis of the shaft, such that a mass of the outer eccentric member forms a distributed load along the geometrical rotation axis of the shaft, wherein the shaft comprises a first stop arrangement for preventing relative rotation between the shaft and the outer eccentric member in a first angular direction at a first end position, and a second stop arrangement for preventing relative rotation between the shaft and the outer eccentric member in a second angular direction, opposite to the first angular direction, at the second end position.

2. An assembly according to claim 1, wherein the extension of the outer eccentric member in the direction parallel with the geometrical rotation axis of the shaft is at least three times the average extension of the outer eccentric member in the radial direction perpendicular to the geometrical rotation axis of the shaft.

3. An assembly according to claim 1, wherein the outer eccentric member has an extension in the direction parallel with the geometrical rotation axis of the shaft exceeding 10% of an unsupported length of the shaft.

4. An assembly according to claim 1, wherein the outer eccentric member has an extension in the direction parallel with the geometrical rotation axis of the shaft exceeding 10% of the length of an eccentric mass of the shaft.

5. An assembly according to claim 1, wherein the outer eccentric member being pivotally mounted relative to the shaft.

6. The assembly according to claim 1, wherein the outer eccentric member exhibits an axial length of at least 100 millimeters.

7. The assembly according to claim 1, wherein the mass of any axial segment of an unsupported axial length of the outer eccentric member differs less than 75% from the mass of any other axial segment of the unsupported axial length of the outer eccentric member with the same axial length.

8. The assembly according claim 1, wherein the mass of an unsupported axial length of the outer eccentric member is substantially regularly distributed over the unsupported axial length of the outer eccentric member.

9. The assembly according to claim 1, wherein the outer eccentric member is attached to the shaft by means of at least two support members, the at least two support members being spaced apart in a direction of the geometrical rotation axis of the shaft and pivotally mounted on the exterior of the shaft.

10. The assembly according to claim 9, wherein each support member is formed as an individual member that connects the outer eccentric member with the shaft.

11. The assembly according to claim 9, wherein one support member is positioned on each side of an eccentric mass of the shaft.

12. The assembly according to claim 1, wherein the outer eccentric member is rotatable relative to the shaft in an angular range that is limited by a first end position at a first end of the range and a second end position at a second end of the range, which angular range is less than 360 degrees.

13. The assembly according to claim 1, wherein the total centre of mass of the shaft and the outer eccentric member is offset from the geometrical rotation axis of the shaft with a first distance when the outer eccentric member is located in a first end position, and the total centre of mass of the shaft and the outer eccentric member is offset from the geometrical rotation axis of the shaft with a second distance when the outer eccentric member is located in a second end position, wherein the first and second distances are different.

14. A compacting machine comprising a frame and at least one compacting drum rotatably connected to the frame, wherein the assembly of claim 1 is mounted to the at least one compacting drum.

15. The compacting machine according to claim 14, further comprising a motor for rotationally driving the assembly in any rotational direction, wherein the assembly is rotationally mounted in two spaced apart parallel supports that are fastened to an interior surface of a cylindrical wall of the compacting drum, which supports are configured to transfer vibrations generated by the assembly to the cylindrical wall.

16. The assembly according to claim 1, wherein the assembly comprises spring means for damping an impact force that may be generated when the outer eccentric member reaches the first end position and/or the second end position.

17. The assembly according to claim 16, wherein the spring means is arranged on the outer eccentric member.

18. The assembly according to claim 17, wherein the spring means is arranged at the end regions of the outer eccentric member.

19. The assembly according to claim 16, wherein the spring means is arranged on the shaft.

20. The assembly according to claim 19, wherein the spring means is arranged at the end regions of the shaft.

21. The assembly according to claim 9, wherein the assembly comprises spring means for damping an impact force that may be generated when the at least two support members are brought into contact with the shaft at the first end position and/or the second end position, wherein the spring means is arranged on one or more of the at least two support members.

22. The assembly according to claim 16, wherein the spring means comprises at least one spring member in form of helical spring, disc spring, spring washer, elastic member, or the like.

23. The assembly according to claim 16, wherein the spring means additionally comprises at least one abutment member arranged to transfer the impact force to the spring member.

24. The assembly according to claim 23, wherein the at least one abutment member cooperates with guiding means for guiding the at least one abutment member along a path, wherein the guiding means is formed of at least one recess in which the at least one abutment member is at least partly positioned.

25. The assembly according to claim 22, wherein the at least one spring member is preloaded.

26. The assembly according to claim 24, wherein the at least one recess is a through-hole, a first abutment member is arranged at a first end of the through-hole, a second abutment member is arranged at a second end of the through-hole, and the spring member is arranged between the first and second abutment member.

27. The assembly according to claim 16, wherein the spring means is positioned in a central region of the outer eccentric member and/or the shaft.

28. The assembly according to claim 1, wherein the outer eccentric member is constituted by at least one leaf spring, and the shaft comprises at least one projecting abutment member positioned in a central region of the shaft, and the leaf spring is arranged to interact with the projecting abutment member for damping the impact force.

29. The assembly according to claim 9, wherein the outer eccentric member is constituted by at least one metal bar that is fastened to the at least two support members.

30. The assembly according to claim 9, wherein the outer eccentric member is constituted by at least two metal bars that are inserted in a recess in at least two support members, and the at least two metal bars are fastened to each of the support members by means of spring means that presses apart the at least two metal bars, such that each of at least two metal bar abuts an opposing inner surface of the recess of the at least two support members.

31. The assembly according to claim 1, wherein the shaft over a majority of its axial extension has substantially a cross-sectional circular segment shape in a plane perpendicular to the geometrical rotation axis of the shaft, wherein the circular segment has a central angle of more than 90 degrees.

32. The assembly according to claim 31, wherein a majority of the mass of the outer eccentric member in a first end position is located inside a geometrical cross-sectional circle in a plane perpendicular to the geometrical rotation axis of the shaft, which circle has the same centre and same radius as the circular segment.

33. The assembly according to claim 31, wherein the geometrical rotation axis of the shaft is positioned within, on or outside a geometrical cross-sectional circle in a plane perpendicular to the geometrical rotation axis of the shaft, which circle has the same centre and same radius as the circular segment.

34. The assembly according to claim 32, wherein the geometrical cross-sectional circle extends within a distance from the geometrical rotation axis of the shaft, which distance is in the range of 0-50 millimeters.

35. The assembly according to claim 9, wherein the each support member has the shape of a connecting rod.

36. The assembly according to claim 1, wherein the shaft is solid.

* * * * *